United States Patent [19]

Nishimoto

[11] Patent Number: 5,084,307

[45] Date of Patent: Jan. 28, 1992

[54] FLAME RETARDANT VEGETABLE FIBER MATERIAL AND THE PROCESS OF THE SAME

[76] Inventor: Kouichi Nishimoto, Momoyama Nagaoka Etchu Minamicho 53, Fushimiku, Kyotoshi, Kyoto, Japan

[21] Appl. No.: 321,837

[22] Filed: Mar. 10, 1989

[30] Foreign Application Priority Data

Mar. 18, 1988 [JP] Japan .................................. 63-66149

[51] Int. Cl.$^5$ .............................................. B05D 1/18
[52] U.S. Cl. .................................. 427/439; 162/159; 428/532; 428/375
[58] Field of Search ................ 162/159; 428/393, 532, 428/375; 427/439

[56] References Cited

U.S. PATENT DOCUMENTS 1,839,136 12/1931 Vivas ............................... 162/159 X
1,909,193  5/1933 Vivas ..................................... 162/159

Primary Examiner—Michael Lusigman
Attorney, Agent, or Firm—Staas & Halsey

[57] ABSTRACT

This specification discloses a flame retardant vegetable fiber material and the process for the production of the same. The adopted means is to immerse the vegetable fiber into a firstly prepared inorganic solution and also into a secondary prepared inorganic solution in turn, while both solutions come into the inherent gaps of the said fiber and become an insoluable and incombustible inorganic compound therewith. The mutual contact and reaction caused by the first and second solutions generate a setting dip and fixation thereupon.

11 Claims, No Drawings

FLAME RETARDANT VEGETABLE FIBER MATERIAL AND THE PROCESS OF THE SAME

BACKGROUND OF THE INVENTION

This invention relates to a flame retardant vegetable fiber material which is developed by the new technical and chemical treatments over an inherently inflammable fiber material such as pulp, cotton fiber and so on. It also relates to the process for the production of the same under the industrial mass production system with ease. This invention has realized the widely applicable technologies over the various industry fields—a technology to supply the filler for the building construction materials instead of asbestos, rock fiber and glass wool, a technology to supply a flame retardant vegetable fiber board, a technology to supply various heat insulating and noise absorbing materials from a flame retardant vegetable fiber, and a technology to supply a flame-resistant paper as well as a technology to supply a new material for use as brake lining material for automobiles.

As is well known, asbestos and rock fiber have been widely and generally used over the building industries because they have some inherent quality of incombustibility, heat resistance, and thermal, as well as noise insulation. Also they these materials have been utilized for a flame-resistant paper as well as the brake lining of the automobile. Recently, however, the medical world warned strongly that asbestos or rock fibers in the air might cause lung cancer when inhaled. Therefore, it is now anxiously desired to develop a new and safe fiber material instead of the above asbestos and rock fiber.

In general mineral fibers other than asbestos and rock fiber may have the quality of incombustibility and heat resistance, but they do not meet the conditions of light weight, thermal and noise insulation required for use as building materials. They also do not satisfy the quality of soft texture, permeability and light weight which are required for a flame-resistant paper. On the other hand, in case mineral fibers other than asbestos and rock fiber are used as the material for the brake linings of the automobile, the satisfactory result of the kinetic energy loading is not obtainable. In addition, the safety over the human health is required, for which it may be safely said that there will be found no proper fiber to satisfy all of the above requirements among the presently existing mineral fibers.

SUMMARY OF THE INVENTION

The present invention has an object to provide a flame retardant vegetable fiber material of long durability developed by the vegetable fiber and produced by putting some insoluable and incombustible inorganic compounds among the gaps of vegetable fiber tightly and fixedly, instead of putting asbestos or rock fiber therewith as was done in the prior art.

Another object is to provide a flame retardant vegetable fiber material which is inexpensive and safe to human health.

The invention has a further object to provide a process of producing a flame retardant vegetable fiber material, which can be proceeded by the industrial mass production method, obtainable from vegetable fiber available in all areas and through the chemical treatments.

According to the present invention, a inorganic compound solution and a second inorganic compound solution are prepared, both of which are in turn penetrating into the gaps of the vegetable fibers, whereon in the said gaps the first and second inorganic solutions are contacted and reacted with each other, whereby the insoluable and incombustible inorganic compounds are generated and fixed, and finally a flame retardant vegetable fiber material is obtained thereupon.

Other objects and advantages of this invention will become obvious upon reference to the accompanying descriptions taken in this specification.

DETAILED DESCRIPTION OF THE PREFERRED EMBODIMENTS

By this invention, two kinds of the inorganic compound solutions are put into the gaps of the vegetable fiber and contact each other therewith, whereon the insoluable and incombustible inorganic compounds are produced, and in order to pratice this embodiment, there are two types for preparing two kind solutions.

One type is dependent upon an ionized inorganic compound solution and an non-ionized inorganic compound solution, both of which produce the insoluable and incombustible inorganic compounds by mutual contact. The former ionized inorganic compound solution is for example: The solution such as magnesium chloride, barium chloride, calcium carbonate, aluminium chloride, aluminium borate and aluminium sulfate. The latter non-ionized inorganic compound solution is for example: The solution such as ammonium phosphate, ammonium pyrophosphate, ammonium magnesia and boric acid soda.

The other type is based on two kinds of disperse phase colloidal solutions, both of which produce the insoluable and incombustible inorganic compounds by mutual contact. The first disperse phase colloidal solution is prepared by: Barium sulfate or barium phosphate is broken into micronization and thereafter dispersed into the water. The second disperse phase colloidal solution is prepared by: Calcium chloride is broken into micronization and thereafter dispersed into the water.

The followings are applicable as the vegetable fiber material by this invention:

(1) Wood pulp(made from both needle leaved and broad leaved trees), straw, esparto, bamboo, flax, Manila hemp, edgeworthia papyrifera, wikstroemia sikokiana, paper mulberry, linter and so on. These materials are mechanically smashed to pieces before use.

(2) Chemical pulp derived from the above material with chemical procedure.

(3) Semi-chemical pulp refined from the above material.

(4) Regenerated pulp from wasted paper or scrap paper.

In general, the gap of the said vegetable fibers occupies several ten percent of their whole fiber cellular tissue, and especially this percentage figure shall become bigger in case of chemical pulp after excluding its lignin.

Now, the actual embodiments of this invention are explained hereunder.

1. The first embodiment

Prepared;

a) saturated water solution of $MgCl_2$ as an ionized inorganic compound water solution, and b) saturated water solution of $(NH_4)_2HPO_4$ as an non-ionized inorganic compound water solution.

Increased the temperature of the above mentioned ionized inorganic compound water solution between 40 degree C. and 60 degree C., into which the swollen pulp in saturated state (the mechanical pulp made from a larch through smashing procedures) is immersed for 5-30 minutes, and then it is taken out of the relative solution for squeezing immersed liquid out, and next, for 10-80 minutes it is again immersed into the other prepared solution of an non-ionized inorganic compound solution with increased temperature between 40 degree C. and 60 degree C., and finally it meets water washing and drying treatment.

As a result, the said pulp, having the increased weight at 50-90 percent in comparison with the original weight as 100 under the absolute dry condition, becomes the flame retardant pulp.

The specimen of the ceiling board with the size of 910 mm(Wide)×1820 mm(Long)×12 mm(Thick) was manufactured from the above processed pulp with piling and compressing mould. The specimen of the board was furnished with flame test at 1000 degree C. for 20 minutes, and it did not catch a fire at all with some visible slight trace of scorch. In view of this field test, it was found that the mechanical pulp of a larch organized in itself a high flame retardant and flame resistant quality.

2. The second embodiment

Prepared;

a) saturated water solution of $MgCl_2$ as an ionized inorganic compound water solution, and b) saturated water solution of $(NH_4)_2HPO_4$ as a non-ionized inorganic compound solution.

Increased the said ionized inorganic compound water solution between 40 degree C. and 60 degree C., into which several flakes of cryptomeria pieces swollen at $100\omega\%$ of moisture content rate are immersed for 5-30 minutes, and then they are taken out of the relative solution for squeezing liquid out, and next, for 30 minutes, they are immersed in the other prepared solution of a non-ionized inorganic compound solution with increased temperature between 40 degree C. and 60 degree C., and finally it meets water washing and drying treatment.

After the said treatment, cryptomeria pieces are hot pressed into a board shape mixed with polyimide resins agent, and the specimen of a particle board with the size of 900 mm(Wide)×900 mm(Long)×15 mm(Thick) was manufactured. The relative specimen was furnished with fire resistant test at 1000 degree C. for 20 minutes, and it did not catch a fire at all with some visible slight trace of scorch and with slight deformation. This field test proved that the tested material was quite proper for flame retardant building equipments.

3. The third embodiment

Prepared;

c) $B_aSO_4$ is broken into micronization with the size of $2\mu$ and dispersed into the water as the first disperse phase colloidal solution, and d) $C_{a3}(PO_4)_2$[or else $C_aCl_2$] is broken into micronization with the size of $2\mu$ and dispersed into the water as the second disperse phase colloidal solution.

Increase the temperature of the first disperse phase colloidal solution upto 40 degree C., into which the cotton fiber swollen at $100\omega\%$ of moisture content rate is immersed for 10-30 minutes, and it is taken out of the said solution for squeezing immersed liquid out, and next, for 10-30 minutes, it is immersed in the second disperse phase colloidal solution with increased temperature of 40 degree C., and finally it undergoes a drying treatment. As a result, the said cotton material increases its weight at 90 percent compared with the original weight of 100 under absolute dry condition, and this extra value of 90 is of incombustible quality.

On the said processed cotton fiber a piece of cigarette with fire has been left until it comes to ashes completely. Almost no trace of scorch is found on the said surface therewith, which proves the superior flame resistance quality.

As explained in the said embodiments, this invention realizes the vegetable fiber material with flame retardant and heat resistant qualities. Furthly, the obtainable flame retardant vegetable fiber material, when in comparison with the former mineral fiber, has various and useful features such as light weight, soft feeling and permeability (these two are the particularities of vegetable fiber), voluminousity, recovering elasticity and high friction endurance, although it is somewhat heavier in weight compared with its original weight.

Therefore, when this newly developed vegetable fiber material is used as the thermal insulation or the noise insulation for the building equipments, it works quite well as the heat insulating material or the sound proof material respectively, and definitely some high efficiency for thermal or noise insulation is obtained. It is also ideal for fire proof construction materials.

At the same time, when this vegetable fiber material is used as the filler for the cement board or the gypsum board, it works for flame resistance exactly same as the asbestos. In addition, it is of quite light weight, and does not incur any cause for the lung cancer at all like the prior asbestos or rock fiber as adopted hence.

The pulp of the vegetable fiber obtained by this invention enables us with ease to produce the flame proof paper by the normal method, and this flame proof paper, in soft touch feeling and peermeability, is superior to that produced from asbestos material.

Furtherly, this newly developed fiber material can endure against the high temperature more than 500 degree C., whereas it can be applied as the material of the brake lining for the motor car.

As explained so far, the present invention discloses the flame retardant vegetable fiber material equipped with both merits of vegetable and mineral fibers, and simultaneously eliminating defects of the said two fibers, and therefore, it is forecasted that this newly developed material might be used over the various fields of the industry.

What is claimed is:

1. A process for making a flame retardant material comprising the steps of:
    preparing an ionized inorganic compound as a first water solution;
    preparing a non-ionized inorganic compound as a second water solution;
    immersing a vegetable fiber material in the first water solution for a predetermined period of time;
    removing the vegetable fiber material from the first water solution and squeezing out the first water solution from the vegetable fiber material;
    immersing the vegetable fiber material in the second water solution for a predetermined period of time; and
    drying the vegetable fiber after removing from the second water solution.

2. A process according to claim 1, further comprising heating the first and second water solutions to between about 40°-60° C. prior to each immersing step.

3. A process according to claim 2, wherein the predetermined period of time for the first immersing step is between about 5-30 minutes, and the predetermined period of time for the second immersing step is between about 10-80 minutes.

4. A process according to claim 1, wherein the first water solution includes an ionized inorganic compound selected from the group consisting of magnesium chloride, barium chloride and calcium carbonate.

5. A process according to claim 1, wherein the second water solution includes a non-ionized inorganic compound selected from the group consisting of ammonium phosphate, ammonium pyrophosphate, ammonium magnesia and basic acid soda.

6. A process for making a flame retardant material comprising the steps of:
   preparing an ionized inorganic compound as a first water solution;
   preparing a first disperse phase colloidal water solution;
   preparing a second disperse phase colloidal water solution;
   immersing a cotton fiber material in the first water solution for a predetermined period of time;
   removing the cotton fiber material from the first water solution and squeezing out the first water solution from the cotton fiber material;
   immersing the cotton fiber material in the second water solution for a predetermined period of time; and
   drying the cotton fiber after removing from the second water solution;
   wherein the second water solution includes $Ca_3(PO_4)_2$ having a particle size of about 2 microns and being dispersed in water.

7. A process according to claim 6, further comprising heating the first and second water solutions up to about 40° C. prior to each immersing step.

8. A process according to claim 7, wherein the predetermined period of time for the first immersing step is between about 10-30 minutes, and the predetermined period of time for the second immersing step is between about 10-30 minutes.

9. A process according to claim 6, wherein the first water solution includes $BaSO_4$ having a particle size of about 2 microns and being disposed in water.

10. A process according to claim 9, wherein the second water solution includes $Ca_3(PO_4)_2$ having a particle size of about 2 microns and being dispersed in water.

11. A process according to claim 8, wherein the second water solution includes $CaCl_2$ having a particle size of about 2 microns and being dispersed in water.

* * * * *